United States Patent
Tang et al.

(10) Patent No.: US 11,696,022 B2
(45) Date of Patent: Jul. 4, 2023

(54) AUXILIARY CAPTURING DEVICE

(71) Applicant: ZHONGSHAN YUEGUANG INTELLIGENT IMAGING TECHNOLOGY CO., LTD., Zhongshan (CN)

(72) Inventors: Wenming Tang, Zhongshan (CN); Siqi Guo, Zhongshan (CN)

(73) Assignee: ZHONGSHAN YUEGUANG INTELLIGENT IMAGING TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 17/577,629

(22) Filed: Jan. 18, 2022

(65) Prior Publication Data
US 2022/0247916 A1    Aug. 4, 2022

(30) Foreign Application Priority Data
Feb. 1, 2021   (CN) .......................... 202110139430.1

(51) Int. Cl.
*H04N 23/66*   (2023.01)
*H04N 23/695*   (2023.01)

(52) U.S. Cl.
CPC ........... *H04N 23/66* (2023.01); *H04N 23/695* (2023.01)

(58) Field of Classification Search
CPC .............................. H04N 23/66; H04N 23/695
See application file for complete search history.

(56) References Cited

U.S. PATENT DOCUMENTS 8,982,272 B1 *   3/2015   Preston .................. H04N 23/67
                                                        348/346
2021/0185217 A1   6/2021   Lanz

FOREIGN PATENT DOCUMENTS

| CN | 110809734 A | 2/2020 |
| JP | H0736143 U | 7/1995 |
| JP | 2005020504 A | 1/2005 |
| JP | 3114063 U | 9/2005 |
| JP | 2010160456 A | 7/2010 |

(Continued)

OTHER PUBLICATIONS

Notice of Reasons for Refusal issued in counterpart Japanese Patent Application No. 2022-006778, dated Dec. 27, 2022.

(Continued)

*Primary Examiner* — Minh Q Phan
(74) *Attorney, Agent, or Firm* — Westbridge IP LLC

(57) ABSTRACT

Disclosed is an auxiliary capturing device for remotely controlling a capturing action of a capturing device. The capturing device is provided with a plurality of function keys, the plurality of function keys includes a press function key, a rotation function key, and a toggle function key, the auxiliary capturing device includes: a device body configured to be detachably mounted on the capturing device; an electric drive mechanism provided on the device body, a plurality of drive portions being formed on the electric drive mechanism, the plurality of drive portions being connected to the press function key, the rotation function key, and the toggle function key, respectively, to drive the press function key, the rotation function key, and the toggle function key to perform corresponding capturing actions; and a control assembly electrically connected to the electric drive mechanism.

20 Claims, 5 Drawing Sheets

(56) References Cited

FOREIGN PATENT DOCUMENTS

| | | |
|---|---|---|
| JP | 2012029152 A | 2/2012 |
| JP | 2013142896 A | 7/2013 |
| JP | 2016102998 A | 6/2016 |

OTHER PUBLICATIONS

Decision to Grant a Patent issued in counterpart Japanese Patent Application No. 2022-006778, dated Apr. 7, 2023.

* cited by examiner

AUXILIARY CAPTURING DEVICE

CROSS-REFERENCE TO RELATED APPLICATIONS

This application claims priority to Chinese Application No. 202110139430.1, filed on Feb. 1, 2021, the entire disclosure of which is incorporated herein by reference.

TECHNICAL FIELD

The present disclosure relates to the technical field of capturing devices, and in particular to an auxiliary capturing device.

BACKGROUND

Due to the limitation of the capturing environment, the photographer needs to observe the state of the subject in real time through the remote control system and modify the focus mode, move the focus point, switch the capturing mode, change the size of the video screen, and set the functions in the viewfinder screen of the capturing device to achieve the best capturing results. Since some capturing devices do not have the permission to read and control data information for some functions, such as Auto Focus (AF) area control, selection of capturing mode, or the like, the remote system cannot adjust the above functions through software, and the photographer cannot adjust various parameters in real time to achieve the best capturing effect.

SUMMARY

The main objective of the present disclosure is to provide an auxiliary capturing device, which aims to solve the problem that since some capturing devices do not have the permission to read and control data information for some functions, such as auto focus area control, selection of capturing mode, or the like, the remote system cannot adjust the above functions through software, and the photographer cannot adjust various parameters in real time to achieve the best capturing effect.

In order to achieve the above objective, the present disclosure provides an auxiliary capturing device for remotely controlling a capturing action of a capturing device, the capturing device is provided with a plurality of function keys, the plurality of function keys include a press function key, a rotation function key, and a toggle function key, wherein the auxiliary capturing device includes:

a device body configured to be detachably mounted on the capturing device;

an electric drive mechanism provided on the device body, a plurality of drive portions being formed on the electric drive mechanism, the plurality of drive portions being connected to the press function key, the rotation function key, and the toggle function key, respectively, to drive the press function key, the rotation function key, and the toggle function key to perform corresponding capturing actions; and a control assembly electrically connected to the electric drive mechanism.

In an embodiment, the device body is provided with an installation cavity, an inner side wall of the installation cavity is provided with a first via hole corresponding to the press function key;

the electric drive mechanism includes a push rod movably extended through the first via hole to abut the press function key, and one of the drive portions is provided on an end of the push rod protruding from the first via hole.

In an embodiment, the device body is provided with an installation cavity, an inner side wall of the installation cavity is provided with an installation hole corresponding to the rotation function key, the electric drive mechanism includes a drive wheel rotatably installed in the installation cavity along a radial direction of the installation hole, the drive wheel is at least partially protruded from the installation hole, and one of the drive portions is formed on a side surface of the drive wheel for frictionally abutting the rotation function key.

In an embodiment, the electric drive mechanism further includes a press drive assembly, and the press drive assembly includes a press drive motor and a rocker arm. The press drive motor has a first drive shaft extending in the radial direction of the first via hole. One end of the rocker arm is fixedly connected to the first drive shaft, such that the other end of the rocker arm moves in a direction towards the first via hole to abut the push rod, or moves in a direction away from the first via hole to move away from the push rod.

In an embodiment, an outer surface of the end of the push rod away from the drive portion is provided with an annular protrusion.

The press drive assembly further includes a return spring, the return spring is sleeved on the outer surface of the push rod, two ends of the return spring abut against the annular protrusion and an inner wall surface of the installation cavity, respectively.

In an embodiment, an end of the push rod away from the drive portion is provided with an extension arm extending in the direction of the first via hole, and a side of the extension arm close to the first via hole is provided with a groove.

The press drive assembly further includes a return spring, and two ends of the return spring respectively abut against the extension arm and the inner wall surface of the installation cavity.

In an embodiment, the press drive motor is a steering gear or a synchronous wheel stepping motor.

In an embodiment, an outer surface of the push rod corresponding to the drive portion is covered with a cushion pad.

In an embodiment, the device body is provided with an installation cavity, an inner side wall of the installation cavity is provided with an installation hole corresponding to the rotation function key.

The electric drive mechanism includes a drive wheel rotatably installed in the installation cavity along a radial direction of the installation hole, the drive wheel at least partially protrudes from the installation hole, and one of the drive portions is formed on a side surface of the drive wheel for frictionally abutting the rotation function key.

In an embodiment, the electric drive mechanism further includes a rotation drive assembly located in the installation cavity, the rotation drive assembly includes a rotation drive motor, and a movable end of the rotation drive motor is fixedly connected to a middle of the drive wheel.

In an embodiment, the drive wheel is detachably mounted on the movable end of the press drive motor.

In an embodiment, an outer surface of the movable end of the rotation drive motor is fixedly sleeved with a fixing ring, and an outer surface of the fixing ring is provided with a plurality of clamping protrusions.

A fixing hole is provided in a middle of the drive wheel, and a plurality of clamping grooves are protrudingly provided in the fixing hole corresponding to the plurality of clamping protrusions, and the plurality of clamping grooves are matching with the plurality of clamping protrusions.

In an embodiment, the drive wheel includes a drive wheel body and an annular rubber wheel fixedly sleeved on an outer surface of the drive wheel body.

In an embodiment, the electric drive mechanism includes a toggle block rotatably mounted on the device body along a thickness direction of the toggle block;

a side surface of the toggle block away from the installation cavity is provided with two clamping columns spaced apart along a width direction of the toggle block, and the two clamping columns jointly form one of the plurality of drive portions for clamping the toggle function key.

In an embodiment, the inner side wall of the installation cavity is provided with a connecting hole.

The electric drive mechanism includes a toggle block drive assembly, and the toggle block drive assembly includes a toggle block drive motor provided in the installation cavity. The movable end of the toggle block drive motor protrudes from the connecting hole to be fixedly connected with the middle of the toggle block.

In an embodiment, outer surfaces of the two clamping columns are covered with cushion pads.

In an embodiment, one end of the toggle block away from the two clamping columns is provided with a limiting groove along a length direction of the toggle block.

The device body is provided with a limiting protrusion corresponding to the limiting groove, when the toggle block swings, the limiting protrusion abuts against two end side walls of the limiting groove to limit a swing stroke of the toggle block.

In an embodiment, a bottom wall surface of the limiting groove is arc-shaped.

In an embodiment, the device body includes:

a housing, an installation cavity being defined inside the housing, the installation cavity being configured for installing the control assembly and the plurality of drive portions; and two installation arms extending along a thickness direction of the housing, the two installation arms being respectively provided at an upper end and a lower end of the housing, the two installation arms being alternately provided in a vertical direction, two side surfaces of the two installation arms being connected to the capturing device.

In an embodiment, one of the two installation arms includes a positioning arm, one end of the positioning arm is fixedly mounted on the housing, and another end of the positioning arm is provided with a threaded hole extending in the vertical direction;

the auxiliary capturing device further includes a fastening bolt extended through the threaded hole to abut against the capturing device.

In an embodiment, one of the two installation arms includes a movable arm, one end of the movable arm is detachably mounted on the housing through a bolt, and another end of the movable arm is abutted against the capturing device.

In an embodiment, the upper end of the housing is further provided with a connecting arm extending in the thickness direction of the housing, the connecting arm is spaced apart from the installation arm at the upper end, one end of the connecting arm is detachably mounted on the housing through a bolt, the connecting arm is formed with a receiving cavity communicating with the installation cavity, and the receiving cavity is used for installing at least one of the plurality of drive portions.

In an embodiment, the housing is provided with an observation window communicating with the installation cavity on a display screen corresponding to the capturing device;

the auxiliary capturing device further includes a viewfinder camera assembly provided in the installation cavity and at least partially exposed on the observation window, the viewfinder camera assembly is electrically connected to the control assembly, and is configured to capture a picture in a viewfinder of the capturing device and transmit the picture to a remote control terminal.

In an embodiment, a rubber band is installed on an outer surface of the housing, and the rubber band is configured to wrap around an outer surface of the capturing device.

In technical solutions of the present disclosure, the remote control terminal sends out a signal, and the control assembly controls the work of the electric drive mechanism according to the received signal instruction, and drives the corresponding drive portion to move, so as to drive the press function key, the rotation function key and the toggle function key to perform corresponding capturing actions, and complete operations such as modifying the focus mode of the camera, moving the focus point, switching the capturing mode, changing the video screen size, and setting the camera functions. The photographer does not need to be lurking in the field, and only needs to control the auxiliary capturing device to simulate the operation of the capturing function key by a human hand, which improves the convenience of remote capturing, thereby improving the capturing effect.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

Figure 1:
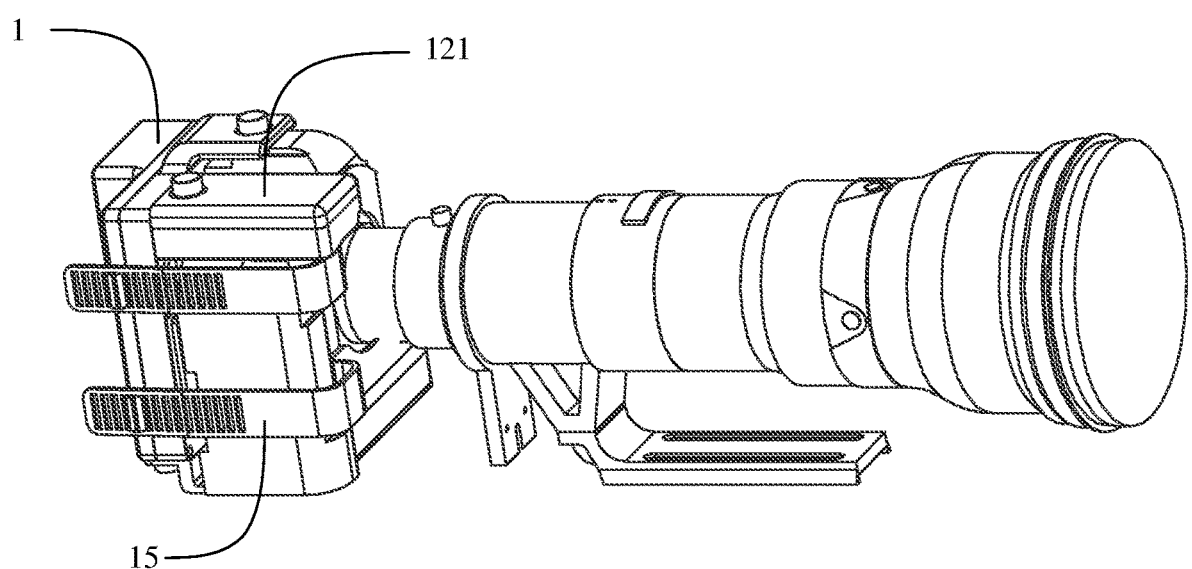
FIG. 1 is a three-dimensional schematic view of an auxiliary capturing device according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication in the embodiments of the present disclosure, the directional indication is only used to explain the relative positional relationship, movement, etc. of the components in a certain posture. If the specific posture changes, the directional indication will change accordingly.

Furthermore, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

Due to the limitation of the capturing environment, the photographer needs to observe the state of the subject in real time through the remote control system and modify the focus mode, move the focus point, switch the capturing mode, change the size of the video screen in the viewfinder screen of the capturing device to achieve the best capturing results. Since some capturing devices do not have the permission to read and control data information for some functions, such as Auto Focus (AF) area control, selection of capturing mode, or the like, the remote system cannot adjust the above functions through software, and the photographer cannot adjust various parameters in real time to achieve the best capturing effect.

In view of this, the present disclosure provides photographers with an auxiliary capturing device that is convenient for remote control of the camera viewfinder screen, which can modify the focus mode, move the focus point, switch the capturing mode, change the size of the video screen, and set the function settings of the camera, which provides photographers with the best capturing results. FIG. 1 to FIG. 7 are an auxiliary capturing device according to some embodiments of the present disclosure.

Figure 2:
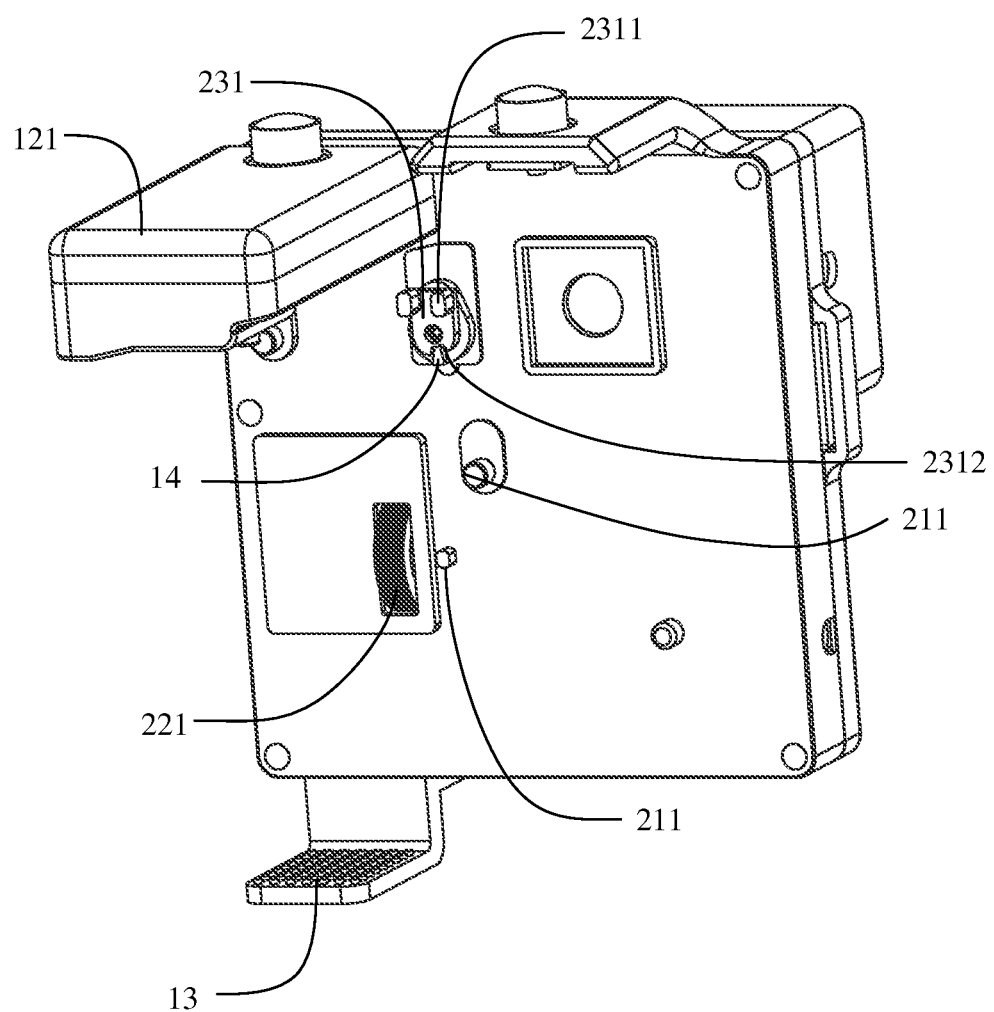
FIG. 2 is a three-dimensional schematic view of a device body in FIG. 1.
Figure 3:
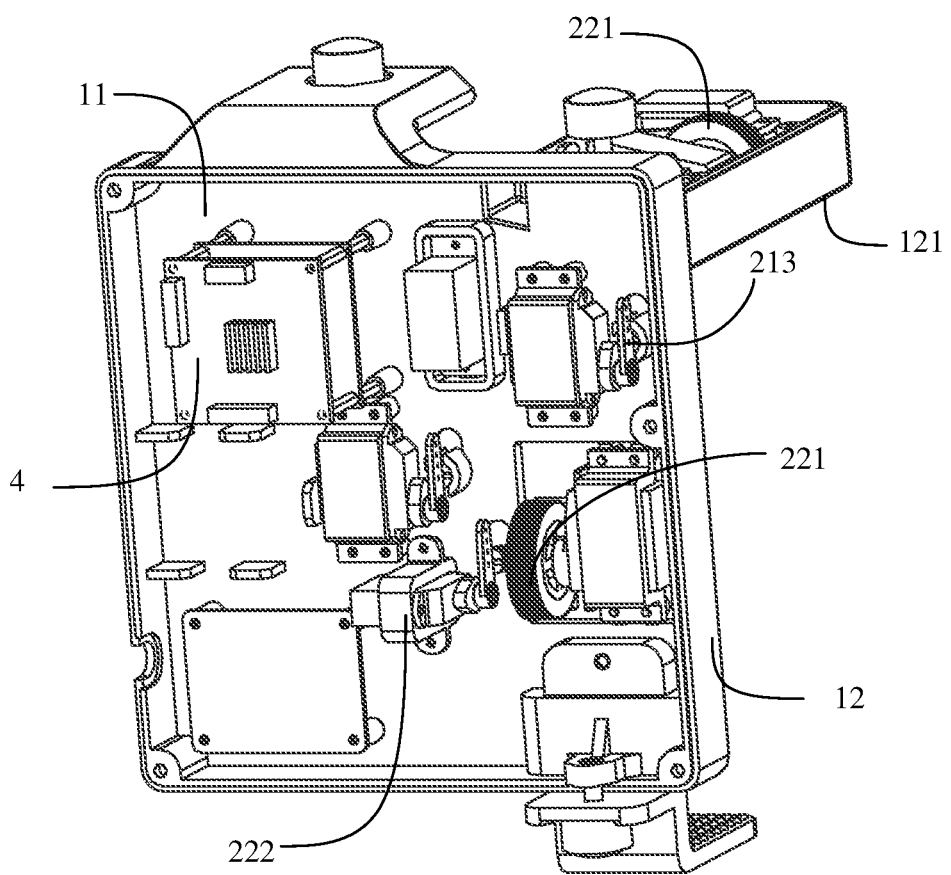
FIG. 3 is a schematic partial cross-sectional view of the device body in FIG. 2.

As shown in FIG. 1 to FIG. 3, the auxiliary capturing device 100 includes a device body 1, an electric drive mechanism and a control assembly. The device body 1 is configured to be detachably mounted on the capturing device. The electric drive mechanism is provided on the device body 1. A plurality of drive portions is formed on the electric drive mechanism, the plurality of drive portions are connected to the press function key, the rotation function key, and the toggle function key, respectively, to drive the press function key, the rotation function key, and the toggle function key to perform corresponding capturing actions. The control assembly is electrically connected to the electric drive mechanism.

In technical solutions of the present disclosure, the remote control terminal sends out a signal, and the control assembly controls the work of the electric drive mechanism according to the received signal instruction, and drives the corresponding drive portion to move, so as to drive the press function key, the rotation function key and the toggle function key to perform corresponding capturing actions, and complete operations such as modifying the focus mode of the camera, moving the focus point, switching the capturing mode, changing the video screen size, and setting the camera functions. The photographer does not need to be lurking in the field, and only needs to control the auxiliary capturing device to simulate the operation of the capturing function key by a human hand, which improves the convenience of remote capturing, thereby improving the capturing effect.

In order to drive the capturing action of the press function key, in the present disclosure, the device body 1 is provided with an installation cavity 11, an inner side wall of the installation cavity 11 is provided with a first via hole corresponding to the press function key. The electric drive mechanism includes a push rod 211 movably passing through the first via hole to abut the press function key, and one of the drive portions is provided on an end of the push rod 211 protruding from the first via hole. During the use of the capturing device, through the reciprocating movement of the push rod 211 along the first via hole, the pressing and releasing of the press function key is realized, thereby completing the driving of the press function key, improving convenience and having a simple structure.

Specifically, the present disclosure does not limit the form of driving the push rod 211, and the push rod 211 can be driven by the motor, screw, cylinder, or the like. In an embodiment, the electric drive mechanism further includes a press drive assembly, and the press drive assembly includes a press drive motor 212 and a rocker arm 213. The press drive motor 212 has a first drive shaft extending in the radial direction of the first via hole. One end of the rocker arm 213 is fixedly connected to the first drive shaft, such that the other end of the rocker arm 213 moves in a direction towards the first via hole to abut the push rod 211, or moves in a direction away from the first via hole to move away from the push rod 211. The press drive motor 212 rotates to drive the rocker arm 213 to swing, so that one end surface of the rocker arm 213 is pressed against the push rod 211 to push the push rod 211 to move linearly in the direction of the press function key. After the pressing action is over, the press drive motor 212 reverses, that is, the rocker arm 213 can be made to swing in the opposite direction, the press drive motor 212 can be placed horizontally, and the direction of the force can be changed by the setting of the rocker arm 213, which saves space and has a simple structure.

Figure 4:
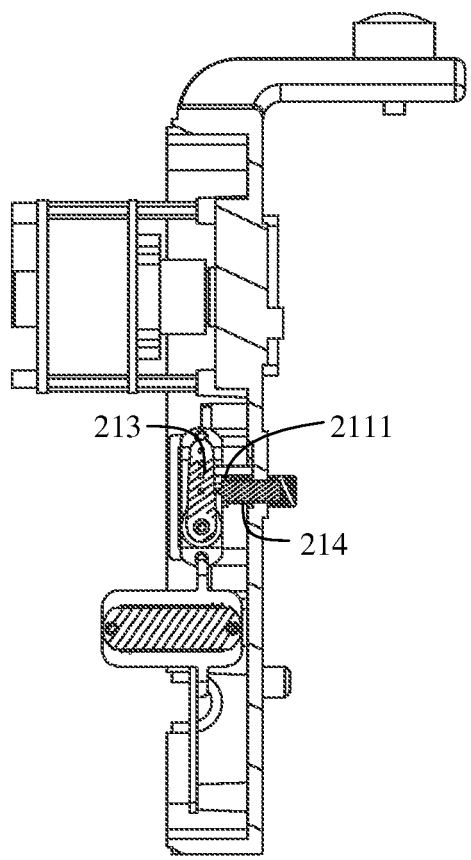
FIG. 4 is a schematic cross-sectional view along a diameter direction of a push rod (in one embodiment) in FIG. 2.

Based on the above embodiments, in order that the push rod 211 can automatically rebound after the rocker arm 213 is away from the push rod 211, in the present disclosure, as shown in FIG. 4, an outer surface of the end of the push rod 211 away from the drive portion is provided with an annular protrusion 2111; the press drive assembly further includes a return spring 214, which is sleeved on the outer surface of the push rod 211, two ends of the return spring 214 abut against the annular protrusion 2111 and the inner wall surface of the installation cavity 11 respectively. When the rocker arm 213 is pressed against the push rod 211, as the rocker arm 213 continues to swing, the return spring 214 is compressed. When the rocker arm 213 swings in the reverse direction, under the action of the spring force, the annular protrusion 2111 is pressed to drive the push rod 211 to move away from the first via hole, thus realizing the automatic rebound, the structure is simple and the cost is low, the return spring 214 can be replaced, and the push rod 211 is sleeved to facilitate guiding and prevent the return spring 214 from deviating.

Figure 5:
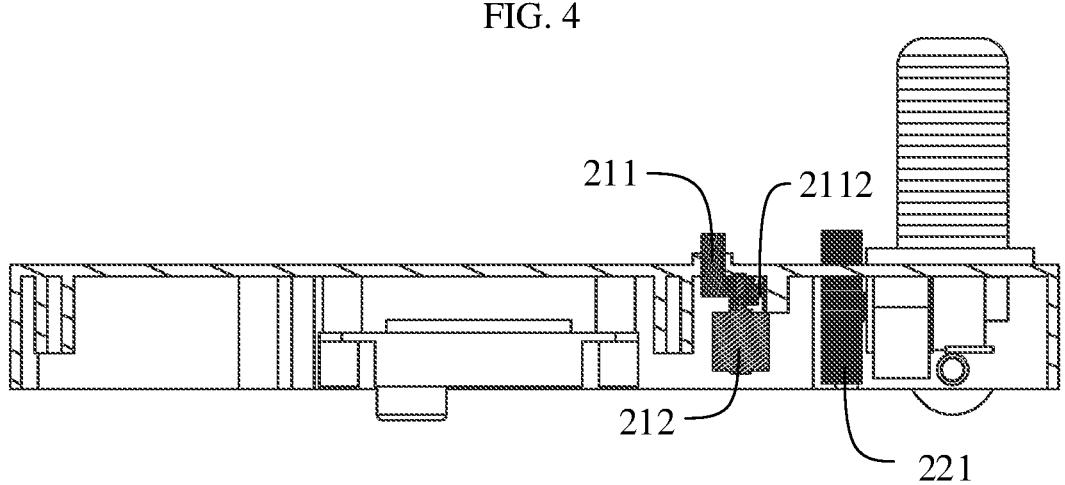
FIG. 5 is a schematic cross-sectional view along the diameter direction of the push rod (in another embodiment) in FIG. 2.

When arranging the space, the press function key can be arranged around the center with the rotation function key. In order to facilitate the space arrangement, in other embodiments of the present disclosure, as shown in FIG. 5, an end of the push rod 211 away from the drive portion is provided with an extension arm 2112 extending in the direction of the first via hole, and a side of the extension arm 2112 close to the first via hole is provided with a groove. The press drive assembly further includes a return spring 214, and two ends of the return spring 214 respectively abut against the extension arm 2112 and the inner wall surface of the installation cavity 11. When the rocker arm 213 is pressed against the push rod 211, as the rocker arm 213 continues to swing, the return spring 214 is compressed. When the rocker arm 213 swings in the reverse direction, under the action of the spring force, the extension arm 2112 is pressed to drive the push rod 211 to move away from the first via hole, thus realizing the automatic rebound, the structure is simple, and the cost is low, the return spring 214 can be replaced, and the groove is arranged to prevent the return spring 214 from deviating during the movement.

It should be noted that the press drive motor 212 is a steering gear or a synchronous wheel stepping motor, which will not be described in detail herein.

In addition, in order to prevent the push rod 211 from strongly pressing against the press function key and causing damage to the function keys of the capturing device, in the present disclosure, the outer surface of the push rod 211 corresponding to the end of the drive portion is covered with a cushion pad. The cushion pad can be rubber or sponge.

Figure 6:
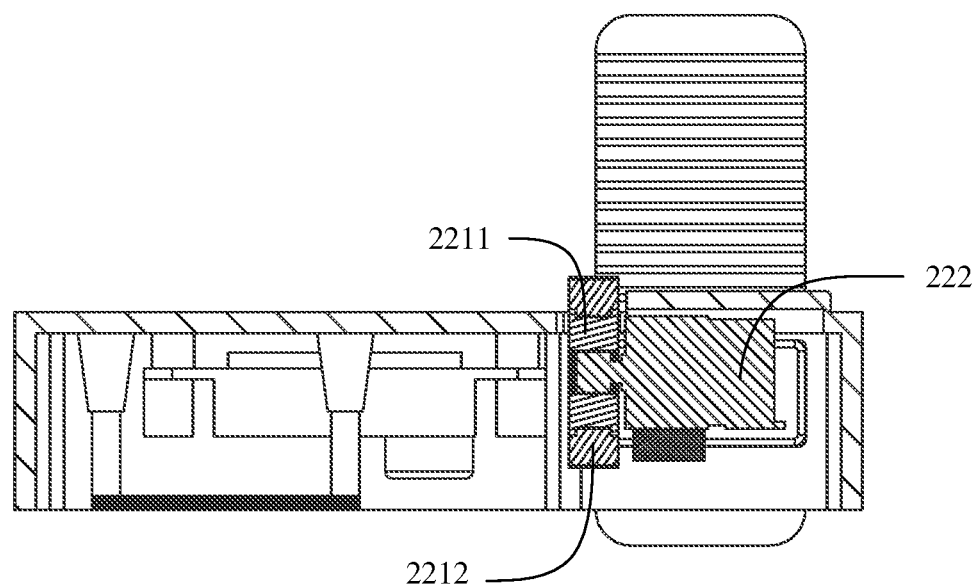
FIG. 6 is a schematic cross-sectional view along a diameter direction of a drive wheel in FIG. 2.

The capturing device has a rotation function button for mode selection by scrolling with a finger, in order to realize the capturing action of driving the rotation function button. As shown in FIG. 3 and FIG. 6, the device body 1 is provided with an installation cavity 11, an inner side wall of the installation cavity 11 is provided with an installation hole corresponding to the rotation function key. The electric drive mechanism includes a drive wheel 221 rotatably installed in the installation cavity 11 along a radial direction of the installation hole, the drive wheel 221 at least partially protrudes from the installation hole, and one of the drive portions is formed on a side surface of the drive wheel 221 for frictionally abutting the rotation function key. The drive wheel 221 rotates, and the rotation function key is driven to rotate by the friction force, so that the mode selection is realized, the convenience is improved, and the structure is simple.

The present disclosure does not limit the form of driving the drive wheel 221, and the drive wheel 221 can be driven by means of a motor, or the like. Specifically, the electric drive mechanism further includes a rotation drive assembly located in the installation cavity 11. The rotation drive assembly includes a rotation drive motor 222, and a movable end of the rotation drive motor 222 is fixedly connected to a middle of the drive wheel 221. The direct drive method has a simple structure. In order to prevent the function keys from being damaged due to excessive speed, a deceleration mechanism can also be provided between the drive wheel 221 and the rotation drive motor 222.

In order to facilitate the replacement of the drive wheel 221, the drive wheel 221 can be detachably installed on the movable end of the press drive motor 212. After a long time of use, the external texture of the drive wheel 221 becomes smooth, the friction force is weakened, which affects the effect of friction drive. Specifically, the outer surface of the movable end of the rotation drive motor 222 is fixedly sleeved with a fixing ring, and an outer surface of the fixing ring is provided with a plurality of clamping protrusions. A fixing hole is provided in a middle of the drive wheel 221, and a plurality of clamping grooves are protrudingly provided in the fixing hole corresponding to the plurality of clamping protrusions, and the plurality of clamping grooves are matching with the plurality of clamping protrusions. When the rotation drive motor 222 rotates, the plurality of clamping protrusions and the plurality of the clamping grooves cooperate with each other, ensuring that the movable end of the drive wheel 221 and the rotation drive motor 222 rotate coaxially without relative movement, which is easy to disassemble.

Further, the drive wheel 221 includes a drive wheel body 2211 and an annular rubber wheel 2212 fixedly sleeved on an outer surface of the drive wheel body 2211. The outer surface of the annular rubber wheel 2212 is provided with lines, which can not only have a large friction force, but the material of the rubber is relatively soft, which can play the role of protecting the function keys.

It should be noted that the rotating drive motor 222 is a steering gear or a stepping motor with a synchronous wheel, which is not described in detail herein.

Figure 7:
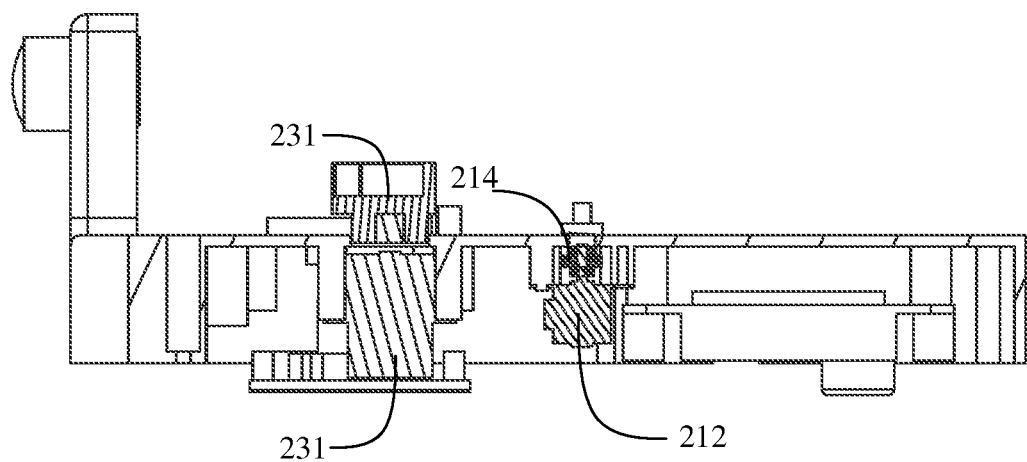
FIG. 7 is a schematic cross-sectional view of a toggle block in FIG. 2.

The toggle function key of the capturing device has two gears, which correspond to the camera mode and the video mode respectively. During the use, by toggling the function key, the selection of the camera mode is realized. In order to realize the capturing action of driving the toggle function key, as shown in FIG. 3 and FIG. 7, the electric drive mechanism includes a toggle block 231 rotatably mounted on the device body 1 along a thickness direction of the toggle block 231. A side surface of the toggle block 231 away from the installation cavity 11 is provided with two clamping columns 2311 spaced apart along a width direction of the toggle block 231, and the two clamping columns 2311 jointly form one of the drive portions for clamping the toggle function key. The two clamping columns 2311 clamp the toggle function key, and the rotation of the toggle block 231 drives the two clamping columns 2311 to rotate, as a result, the toggle function key is moved from one gear to another gear, and the clamping mode of the two clamping columns 2311 is more stable.

The present disclosure does not limit the form of driving the toggle block 231, and the toggle block 231 can be driven by means of a motor, a lead screw, or the like. In an embodiment, the inner side wall of the installation cavity 11 is provided with a connecting hole. The electric drive mechanism includes a toggle block drive assembly, and the toggle block drive assembly includes a toggle block drive motor 232 provided in the installation cavity 11. The movable end of the toggle block drive motor 232 protrudes from the connecting hole to be fixedly connected with the middle of the toggle block 231. The motor-driven method has a simple structure and takes up little space. The switching between the two gears can be realized by the forward rotation and the reverse rotation of the toggle block drive motor 232.

In order to prevent the long-term use of the toggle block function key from causing abrasion, in the present disclosure, the outer surfaces of the two clamping columns 2311 are covered with the cushion pad. The cushion pad can be rubber or sponge.

In order to prevent the drive force of the motor from being too large, causing the toggle angle to be too large and causing the toggle function key to break, in the present disclosure, one end of the toggle block 231 away from the two clamping columns 2311 is provided with a limiting groove 2312 along the length direction of the toggle block 231. The device body 1 is provided with a limiting protrusion 14 corresponding to the limiting groove 2312. When the toggle block 231 swings, the limiting protrusion 14 abuts against two end side walls of the limiting groove 2312 to limit the swing stroke of the toggle block 231, thus improving the safety performance, preventing the toggle function key from breaking due to the excessively large toggle angle. The rotation angle is relatively small, easier to control, and the mechanical limit method is more stable.

In some embodiments of the present disclosure, the device body includes a housing 12 and two installation arms 13. An installation cavity 11 is formed inside the housing 12, and the installation cavity 11 is used for installing the control assembly and the drive portion. Two installation arms 13 are extending along a thickness direction of the housing 12, the two installation arms 13 are respectively provided at an upper end and a lower end of the housing 12, the two installation arms 13 are alternately provided in a vertical direction, and two side surfaces of the two installation arms 13 are connected to the capturing device. The arrangement of the installation cavity 11 saves space and makes the appearance more beautiful. The device body 1 can be fixedly installed on the hot shoe socket on the top of the capturing device through the two installation arms 13 to facilitate fixing and installation.

Further, one of the two installation arms 13 includes a positioning arm 131, one end of the positioning arm 131 is fixedly mounted on the housing 12, and another end of the positioning arm 131 is provided with a threaded hole extending in the vertical direction. The auxiliary capturing device 100 further includes a fastening bolt 3 that passes through the threaded hole to abut against the capturing device. The structure is simple, and installation and disassembly can be realized by rotating the fastening bolt 3, and the cost is low.

Furthermore, one of the two installation arms 13 includes a movable arm, one end of the movable arm is detachably mounted on the housing 12 through a bolt, and another end of the movable arm is against the capturing device. As such, the position adjustment of the movable arm can be realized, and the bolts can be tightened by rotating, which can adapt to different models and is more flexible.

Due to the location of the function keys of the capturing device, in order to better match the function keys of the capturing device, in the present disclosure, the upper end of the housing 12 is further provided with a connecting arm 121, the connecting arm 21 is extended in the thickness direction of the housing 12, the connecting arm 121 is spaced apart from the installation arm 13 at the upper end, one end of the connecting arm 121 is detachably mounted on the housing 12 through a bolt, the connecting arm 121 is formed with a receiving cavity communicating with the installation cavity 11, and the receiving cavity is used for installing at least one of the drive portions, to adapt to the drive of the function keys on different planes.

In order to facilitate the user to observe the capturing picture and function adjustment in real time, the housing 12 is provided with an observation window communicating with the installation cavity 11 on a display screen corresponding to the capturing device. The auxiliary capturing device 100 further includes a viewfinder camera assembly 4 provided in the installation cavity 11 and at least partially exposed on the observation window, the viewfinder camera assembly 4 is electrically connected to the control assembly, and is configured to capture a picture in a viewfinder of the capturing device and transmit the picture to a remote control terminal. The viewfinder camera assembly 4 can take pictures in the viewfinder in real time and display them on the remote control terminal, which is convenient for the user to observe the picture taken and the function adjustment conditions in real time.

In addition, a rubber band 15 is installed on the outer surface of the housing 12, the rubber band 15 is configured to wrap around the outer surface of the capturing device to facilitate the installation of the device body 1 and prevent collision and misalignment by foreign objects when used in the field.

The specific use environment takes a digital camera as an example. The capturing actions corresponding to the press function key are confirm, activate, call up the operation interface, shutter, return, or the like. The capturing actions corresponding to the rotation function key are selecting different movie sizes, moving the focus point up, down, left, and right, or the like. The capturing action corresponding to the toggle function key is to switch the capturing mode (photograph/video), or the like. According to the type and setting position of the function keys of different models of digital cameras, the corresponding drive portions are matched, to realize remote control of the digital camera to modify the focus mode, move the focus point, switch the capturing mode, change the function of the video screen size, and set the function of the capturing device.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. An auxiliary capturing device for remotely controlling a capturing action of a capturing device, the capturing device being provided with a plurality of function keys, the plurality of function keys comprising a press function key, a rotation function key, and a toggle function key, wherein the auxiliary capturing device comprises:
    a device body configured to be detachably mounted on the capturing device;
    an electric drive mechanism provided on the device body, a plurality of drive portions being formed on the electric drive mechanism, the plurality of drive portions being connected to the press function key, the rotation function key, and the toggle function key, respectively, to drive the press function key, the rotation function key, and the toggle function key to perform corresponding capturing actions; and
    a control assembly electrically connected to the electric drive mechanism.

2. The auxiliary capturing device of claim 1, wherein the device body is provided with an installation cavity, an inner side wall of the installation cavity is provided with a first via hole corresponding to the press function key; and
    the electric drive mechanism comprises a push rod movably extended through the first via hole to abut the press function key, and one of the drive portions is provided on an end of the push rod protruding from the first via hole.

3. The auxiliary capturing device of claim 1, wherein the device body is provided with an installation cavity, an inner side wall of the installation cavity is provided with an installation hole corresponding to the rotation function key, and
    the electric drive mechanism comprises a drive wheel rotatably installed in the installation cavity along a radial direction of the installation hole, the drive wheel is at least partially protruded from the installation hole, and one of the drive portions is formed on a side surface of the drive wheel for frictionally abutting the rotation function key.

4. The auxiliary capturing device of claim 3, wherein the electric drive mechanism comprises a toggle block rotatably mounted on the device body along a thickness direction of the toggle block; and
 a side surface of the toggle block away from the installation cavity is provided with two clamping columns spaced apart along a width direction of the toggle block, and the two clamping columns jointly form one of the plurality of drive portions for clamping the toggle function key.

5. The auxiliary capturing device of claim 1, wherein the device body comprises:
 a housing, an installation cavity being defined inside the housing, the installation cavity being configured for installing the control assembly and the plurality of drive portions; and
 two installation arms extending along a thickness direction of the housing, the two installation arms being respectively provided at an upper end and a lower end of the housing,
 the two installation arms being alternately provided in a vertical direction, two side surfaces of the two installation arms being connected to the capturing device.

6. The auxiliary capturing device of claim 5, wherein one of the two installation arms comprises a positioning arm, one end of the positioning arm is fixedly mounted on the housing, and another end of the positioning arm is provided with a threaded hole extending in the vertical direction; and
 the auxiliary capturing device further comprises a fastening bolt extended through the threaded hole to abut against the capturing device.

7. The auxiliary capturing device of claim 5, wherein one of the two installation arms comprises a movable arm, one end of the movable arm is detachably mounted on the housing through a bolt, and another end of the movable arm is abutted against the capturing device.

8. The auxiliary capturing device of claim 5, wherein the upper end of the housing is further provided with a connecting arm extending in the thickness direction of the housing, the connecting arm is spaced apart from the installation arm at the upper end, one end of the connecting arm is detachably mounted on the housing through a bolt, the connecting arm is formed with a receiving cavity communicating with the installation cavity, and the receiving cavity is used for installing at least one of the plurality of drive portions.

9. The auxiliary capturing device of claim 5, wherein the housing is provided with an observation window communicating with the installation cavity on a display screen corresponding to the capturing device; and
 the auxiliary capturing device further comprises a viewfinder camera assembly provided in the installation cavity and at least partially exposed on the observation window, the viewfinder camera assembly is electrically connected to the control assembly, and is configured to capture a picture in a viewfinder of the capturing device and transmit the picture to a remote control terminal.

10. The auxiliary capturing device of claim 5, wherein a rubber band is installed on an outer surface of the housing, and the rubber band is configured to wrap around an outer surface of the capturing device.

11. The auxiliary capturing device of claim 2, wherein the electric drive mechanism further comprises a press drive assembly, and the press drive assembly comprises:
 a press drive motor having a first drive shaft extending in a radial direction of the first via hole; and
 a rocker arm, wherein one end of the rocker arm is fixedly connected to the first drive shaft, such that another end of the rocker arm moves in a direction towards the first via hole to abut the push rod, or moves in a direction away from the first via hole to move away from the push rod.

12. The auxiliary capturing device of claim 11, wherein an outer surface of the push rod away from the drive portion is provided with an annular protrusion; and
 the press drive assembly further comprises a return spring sleeved on the outer surface of the push rod, and two ends of the return spring are respectively abutted against the annular protrusion and an inner wall surface of the installation cavity.

13. The auxiliary capturing device of claim 11, wherein an end of the push rod away from the drive portion is provided with an extension arm extending in the radial direction of the first via hole, and a side of the extension arm close to the first via hole is provided with a groove; and
 the press drive assembly further comprises a return spring, and two ends of the return spring are respectively abutted against the extension arm and an inner wall surface of the installation cavity.

14. The auxiliary capturing device of claim 11, wherein a drive wheel is detachably mounted on a movable end of the press drive motor.

15. The auxiliary capturing device of claim 1, wherein the electric drive mechanism further comprises a rotation drive assembly located in the installation cavity, the rotation drive assembly comprises a rotation drive motor, and a movable end of the rotation drive motor is fixedly connected to a middle of a drive wheel.

16. The auxiliary capturing device of claim 15, wherein an outer surface of the movable end of the rotation drive motor is fixedly sleeved with a fixing ring, and an outer surface of the fixing ring is provided with a plurality of clamping protrusions; and a fixing hole is provided in the middle of the drive wheel, a plurality of clamping grooves are protrudingly provided in the fixing hole corresponding to the plurality of clamping protrusions, and the plurality of clamping grooves are matching with the plurality of clamping protrusions.

17. The auxiliary capturing device of claim 2, wherein the inner side wall of the installation cavity is defined with a connecting hole; and
 the electric drive mechanism comprises a toggle block drive assembly, the toggle block drive assembly comprises a toggle block drive motor provided in the installation cavity, and a movable end of the toggle block drive motor protrudes from the connecting hole to be fixedly connected with a middle of the toggle block.

18. The auxiliary capturing device of claim 4, wherein outer surfaces of the two clamping columns are covered with cushion pads.

19. The auxiliary capturing device of claim 4, wherein one end of the toggle block away from the two clamping columns is provided with a limiting groove along a length direction of the toggle block; and
 the device body is provided with a limiting protrusion corresponding to the limiting groove, when the toggle block swings, the limiting protrusion is abutted against two end side walls of the limiting groove to limit a swing stroke of the toggle block.

20. The auxiliary capturing device of claim 19, wherein a bottom wall surface of the limiting groove is arc-shaped.

\* \* \* \* \*